United States Patent Office 3,503,851
Patented Mar. 31, 1970

3,503,851
PROCESS FOR PROMOTING BACTERIAL SPORULATION
Vadake R. Srinivasan, Baton Rouge, La., assignor to Research Corporation, New York, N.Y., a non-profit corporation of New York
No Drawing. Filed Nov. 23, 1966, Ser. No. 596,428
Int. Cl. C12k 3/00
U.S. Cl. 195—96    5 Claims

ABSTRACT OF THE DISCLOSURE

The sporulation of B. popilliae is promoted by growing the organism in a liquid nutrient medium under aerobic conditions in the presence of a chloroaliphatic compound.

---

This invention relates to the control of the Japanese beetle and other related organisms such as the European Chafer. In one specific aspect, it relates to a method for promoting the sporulation of Bacillus popilliae.

Since first observed in the United States in 1916, the Japanese beetle has spread from Maine to Georgia and from the eastern seaboard to the Mississippi River and is found in almost half of the states. The beetles feed on a great variety of farm crops and ornamental vegetation causing millions of dollars worth of damage each year.

The most effective method to date for Japanese beetle control is the infestation of the beetle population with milky disease, a fatal disease caused by the host-specific pathogen B. popilliae. The method has the advantage of being selective and not leaving insecticidal or other residues toxic to other forms of life. When Japanese beetle larvae feed on soil containing the spores of B. popilliae, they become infected at a particular instar of their life cycle. The organism multiplies in the gut of the larvae and at death the hemolymph of the larvae is filled with spores imparting a characteristic milky appearance to the hemolymph which is descriptive of the disease.

The vegetative cells of B. popilliae cannot be conveniently employed in a Japanese beetle control program because of their high sensitivity and poor viability under spraying and field conditions. B. popilliae spores, while highly resistant to adverse environmental conditions and capable of distribution by spraying, have not been extensively employed in control work heretofore primarily because the spores were not available in large enough quantities.

It is, therefore, a principal object of the present invention to provide a convenient method for the production of B. popilliae spores in large quantities.

It is a further object of the invention to provide a liquid culture fermentation method for the production of B. popilliae spores.

These and other desirable objects and advantages of the present invention are obtained by the inclusion of an organo chloro compound in conventional liquid nutrient medium for the cultivation of B. popilliae. More specifically, my invention is a method for promoting the sporulation of B. popilliae comprising growing B. popilliae under aerobic conditions in a liquid nutrient medium for the organism in the presence of an organo chloro compound.

Suitable aqueous liquid media for the cultivation of B. popilliae are well known to those skilled in the art. A particularly preferred medium for use in the process of the present invention contains yeast extract, glucose, glycerol and sodium chloride in the following proportions:

| Ingredient: | Percent (w./v.) |
|---|---|
| Yeast extract | 0.05–1.0 |
| Glucose | 0.05–0.5 |
| Glycerol | 0.05–0.5 |
| Sodium chloride | 0.50–1.5 |

According the to present invention, a small amount of an organo chloro compound is added to the nutrient medium at the time of inoculation with B. popilliae An organo chloro compound is an organic compound having at least one chlorine-carbon bond, i.e., chloroaliphatic or chloroaromatic. The remaining valences of the carbon may be satisfied by additional chlorine atoms and/or hydrogen, lower-alkyl, carbonyl and other conventional carbon substituents. While chlorinated hydrocarbons such as chloroform and trichlorethane are suitable for use in the process of the present invention, less volatile and somewhat more water soluable organo chloro compounds, particularly the chloro derivatives of compounds structurally related to metabolites found in biological systems, are preferred. The chlorinated alkane acid amides such as tri-, di- and monochloroacetamide are particularly preferred; it has been observed that increasing the number of chlorine carbon bonds per molecule generally increases the amount of sporulation obtained. Chlorinated aryl compounds such as chlorobenzene and the more soluble chlorophenylalanine may also be employed in the present process. When a volatile alkyl or aryl chlorohydrocarbon is employed, additional chlorohydrocarbon may be added at intervals in order to maintain its presence in the nutrient medium.

Using the method of the present invention, sporulation usually occurs on the third day and is complete by the end of the fourth day after inoculation. My invention is further illustrated by means of the following non-limiting examples:

The preferred aqueous-base nutrient medium employed contained the following ingredients:

| Ingredient: | Percent (w./v.) |
|---|---|
| Yeast extract | 0.4 |
| Glucose | 0.4 |
| Glycerol | 0.2 |
| Sodium chloride | 0.5 |

The medium also contained the following minerals in trace amounts as indicated:

| Mineral: | Percent by weight |
|---|---|
| Ammonium sulfate | $2 \times 10^{-1}$ |
| Potassium acid phosphate | $5 \times 10^{-2}$ |
| Manganese sulfate·$H_2O$ | $5 \times 10^{-3}$ |
| Calcium chloride | $5 \times 10^{-3}$ |
| Zinc sulfate·$7H_2O$ | $5 \times 10^{-4}$ |
| Copper sulfate·$5H_2O$ | $5 \times 10^{-4}$ |
| Ferrous sulfate·$7H_2O$ | $5 \times 10^{-5}$ |

Trichloroacetamide $5 \times 10^{-3}\%$ (w./v.) was added and the medium was inoculated with a small volume of a suspension of B. popilliae spores. The inoculated culture medium containing the organo chloro compound was incubated at 30° C. using a shaker for constant aeration. After four days of incubation, there was obtained an average of 3 to $5 \times 10^8$ spores per milliliter of medium (about 80% sporulation). Similar results were obtained using dichloroacetamide and monochloroacetamide in place of trichloroacetamide as the organo chloro compound and using varius strains of *B. popilliae*. Experiments using chloroform or trichloroethane as the organo chloro compound in a related medium gave 1 to $5 \times 10^7$ spores per milliliter of medium.

The *B. popilliae* spores obtained can be harvested from the culture medium and sprayed with the usual equipment used in the application of insecticides in the field. Or the spores may be concentrated by spray drying for economy in storage or transportation and reconstituted with fluid prior to use.

The present invention has been described and illustrated by means of preferred embodiments. It will be apparent to those skilled in the art that various modifications may be made in the disclosed embodiments without departing from the spirit or the scope of the invention. My invention is as claimed.

I claim:

1. A method for promoting the sporulation of *B. popilliae* comprising growing *B. popilliae* in a liquid nutrient medium for the organism under aerobic conditions and in the presence of a chloroaliphatic compound.

2. A method according to claim 1 wherein the liquid nutrient medium contains yeast extract, glycerol, glucose, salt and trace mineral elements.

3. A method according to claim 1 wherein the chloroaliphatic compound is a chloro alkane acid amide.

4. A method according to claim 3 wherein the acid amide is trichloroacetamide.

5. A method according to claim 2 wherein the organism is cultivated at about 30° C. for about 72–96 hours.

References Cited

UNITED STATES PATENTS 3,308,038    3/1967    Rhodes et al. _____ 195—96

OTHER REFERENCES

Costilow et al., Applied Microbiology, vol. 14, No. 2, pages 161–169, March 1966.

LIONEL M. SHAPIRO, Primary Examiner